United States Patent
Ye et al.

(10) Patent No.: US 10,127,690 B2
(45) Date of Patent: Nov. 13, 2018

(54) PET RANDOM COINCIDENCE CORRECTION

(71) Applicant: KONINKLIJKE PHILIPS N.V., Eindhoven (NL)

(72) Inventors: Jinghan Ye, Cupertino, CA (US); Xiyun Song, Cupertino, CA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 46 days.

(21) Appl. No.: 15/304,538

(22) PCT Filed: Apr. 23, 2015

(86) PCT No.: PCT/IB2015/052967
§ 371 (c)(1),
(2) Date: Oct. 17, 2016

(87) PCT Pub. No.: WO2015/162580
PCT Pub. Date: Oct. 29, 2015

(65) Prior Publication Data
US 2017/0046857 A1 Feb. 16, 2017

Related U.S. Application Data

(60) Provisional application No. 61/983,074, filed on Apr. 23, 2014.

(51) Int. Cl.
*G06K 9/00* (2006.01)
*G06T 11/00* (2006.01)
(Continued)

(52) U.S. Cl.
CPC ............ *G06T 11/005* (2013.01); *G06T 3/40* (2013.01); *G06T 7/0012* (2013.01); *G06T 2207/10104* (2013.01); *G06T 2207/30242* (2013.01)

(58) Field of Classification Search
None
See application file for complete search history.

(56) References Cited

U.S. PATENT DOCUMENTS 7,381,959 B2 6/2008 Manjeshwar
8,022,368 B2 9/2011 Watson
(Continued)

OTHER PUBLICATIONS

Object shape dependent scatter simulations for PET, by Barney et al., IEEE vol. 38, No. 2, Apr. 1991, pp. 719-725.*
(Continued)

*Primary Examiner* — Vikkram Bali

(57) ABSTRACT

A positron emission tomography (PET) imaging system (10) includes a singles unit (24), a delay unit (26), a scaling unit (28), and a reconstruction unit (30). The singles unit (24) is configured to generate a correction sinogram of random coincidences defined by a coincidence time window $t_w$ and a time period t based on $r_{ij}=2\,t\,s_i\,s_j$ where $r_{ij}$ is an estimate of the random coincidences in the time period t between singles at detector locations $s_i$ and $s_j$. The delay unit (26) is configured to determine delay coincidences in the time period t defined by a delay coincidence time window of a paired coincidences including $t_w$ to 2 $t_w$. The scaling unit (28) is configured to scale the correction sinogram of random coincidences based on the delay coincidences. The reconstruction unit (30) is configured to iteratively reconstruct one or more images based on the scaled random sinogram and a prompt sinogram for the time period t.

19 Claims, 2 Drawing Sheets

Figure 1:
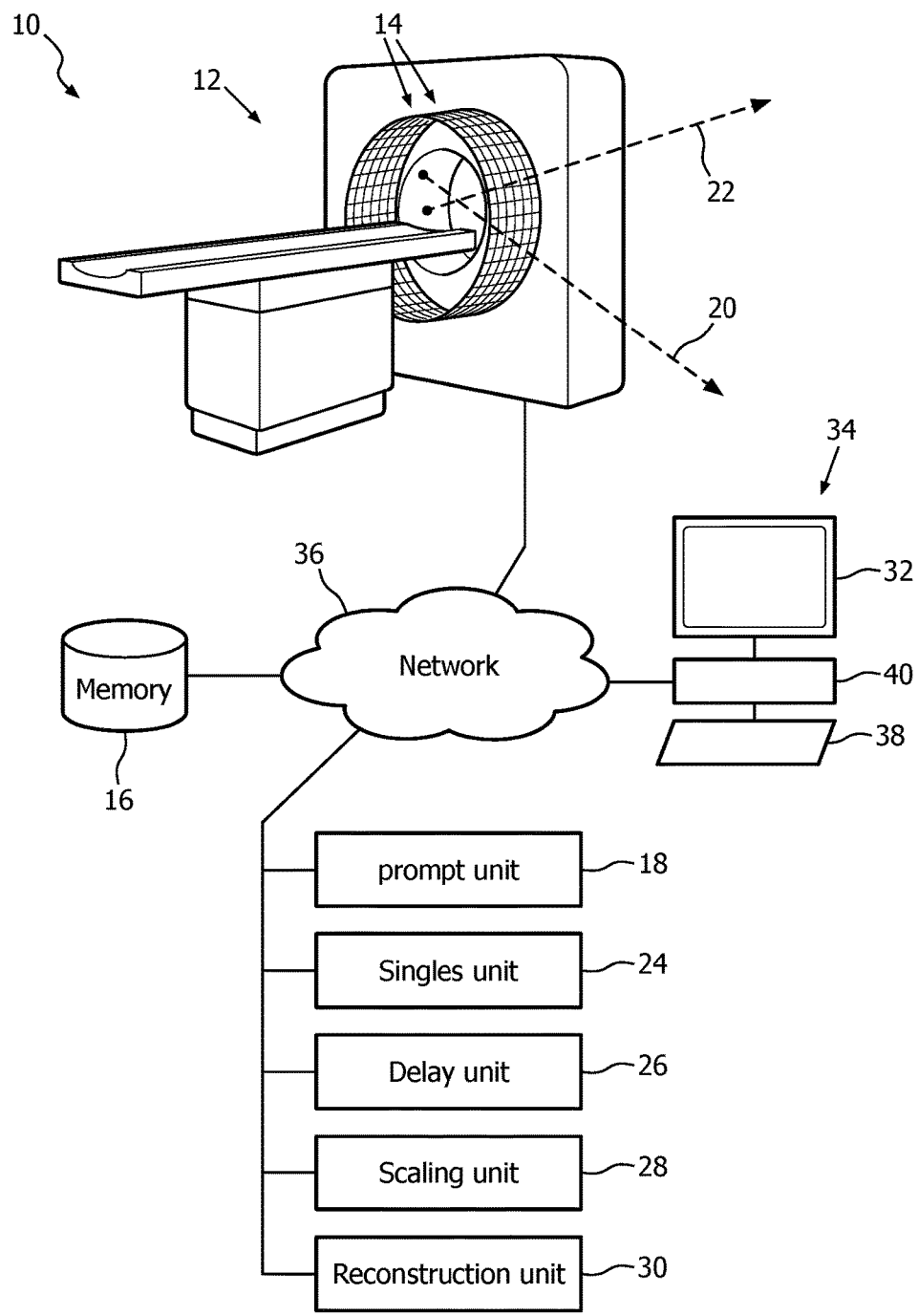

(51) Int. Cl.
*G06T 3/40* (2006.01)
*G06T 7/00* (2017.01)

(56) References Cited

U.S. PATENT DOCUMENTS

| | | |
|---|---|---|
| 8,094,908 B2 | 1/2012 | Stearns |
| 8,359,345 B2 | 1/2013 | Panin |
| 2009/0072154 A1 | 3/2009 | Watson |
| 2011/0142316 A1* | 6/2011 | Wang .................... G06T 11/006 382/131 |
| 2015/0230762 A1* | 8/2015 | Alpert .................... A61B 6/037 600/425 |
| 2016/0048615 A1* | 2/2016 | Kolthammer ......... G06T 11/005 703/2 |

OTHER PUBLICATIONS

Watson, et al. "A hybrid algorithm for randoms variance reduction", 2009 IEEE Nuclear Science Symposium and Medical Imaging Conference.

Oliver, et al., "Singles-prompt: a novel method to estimate random coincidences by using prompts and singles information", Proc. SPIE 7961, Medical Imaging 2011: Physics of Medical Imaging, 796149 (Mar. 16, 2011).

Stearns, et al., "Random Coincidence Estimation from Single Event Rates on the Discovery ST PET/CT Scanner", 2004 IEEE.

Brasse, et al., "Correction Methods for Random Coincidences in Fully 3D Whole-Body PET: Impact on Data and Image Quality", JNM 2005; 46(5):859-867.

* cited by examiner

PET RANDOM COINCIDENCE CORRECTION

CROSS REFERENCE TO RELATED APPLICATIONS

This application is the U.S. National Phase application under 35 U.S.C. § 371 of International Application No. PCT/IB2015/052967, filed Apr. 23, 2015, published as WO 2015/162580 on Oct. 29, 2015, which claims the benefit of U.S. Provisional Patent Application No. 61/983,074 filed Apr. 23, 2014. These applications are hereby incorporated by reference herein.

The following relates generally to nuclear medicine imaging. It finds particular application in conjunction with Positron Emission Tomography (PET) and random coincidence estimation, and will be described with particular reference thereto. However, it will be understood that it also finds application in other usage scenarios and is not necessarily limited to the aforementioned application.

In PET imaging, detected coincidences from a radiopharmaceutical administered to a patient include true, scatter, single, and random coincidences. True coincidences are the result of a positron emission and subsequent annihilation which generates two gamma photons along a line of response (LOR). Detectors of a PET scanner, typically in a ring configuration, detect the photons. When two gamma photons are received with in a selected coincidence time window, the gamma photons are taken as a coincident event and are used to define an LOR. When one gamma photon is received and a second is not received within the coincidence window, the event is taken as a single. The LORs are used to determine the location of the annihilation event indicative of a location of metabolic activity targeted by the radiopharmaceutical. A measure of the true coincidences is useful to determine quantitative measurements of diseased tissues, such as tumors.

However, detected photons include other non-true coincidences or other detected photons which can affect the measure of true coincidences. For example, scatter events are coincidences in which one or both gamma photons are Compton scattered resulting in the LOR between the two photon detector locations being different from the actual defined path followed by the photons. Scatter events can be identified based on a lower energy level of a photon, e.g. less than 511 keV. Single events occur when only one photon is detected within a time window, $t_w$, e.g. less than time $t_w$ such as 2-6 nanoseconds. The non-detected photon is either absorbed by the tissues of the patient or travels outside the detector array. Singles are identified by a time window, e.g. no corresponding photon is detected within the time $t_w$. Random coincidences are the result of two or more annihilation events and only one gamma photon from each event is detected, e.g. one photon from event 1 and one photon from event 2. The photons are detected within the energy and time windows, but the detected photons are from two different events.

The coincidence pairs or prompts measured by the detectors within the time and energy windows include true coincidences and random coincidences. One approach taken to correct the prompts for the random coincidences subtracts delay coincidences. The delay coincidences are detected photons with a first detected photon within a time and energy window, and a second photon detected within the energy window, outside the time window $t_w$, and within a second time window. The second time window is equal to the original time window, e.g. $t_w$ to $2t_w$. Use of delay coincidences do not add bias but increase noise. Another approach uses singles as an estimation of the random coincidences. The singles estimation uses for a measure of random coincidences, $r_{ij}=2\,t\,s_i\,s_j$, where t is the time period, and $s_i$ and $s_j$ are the singles rate at detected pixels i and j respectively. The singles provide a noiseless estimate of random coincidences which includes bias. Each of the current methods makes different tradeoffs between noise amplification, bias, and data-processing requirements.

The following discloses a new and improved PET random coincidences correction which addresses the above referenced issues, and others.

In accordance with one aspect, positron emission tomography (PET) imaging system includes a singles unit, a delay unit, a scaling unit, and a reconstruction unit. The singles unit is configured to generate a correction sinogram of random coincidences defined by a coincidence time window $t_w$ and a time period t based on $r_{ij}=2\,t\,s_i\,s_j$ where $r_{ij}$ is an estimate of the random coincidences in the time period t between singles at detector locations $s_i$ and $s_j$. The delay unit is configured to determine delay coincidences in the time period t defined by a delay coincidence time window of a paired coincidences including $t_w$ to $2\,t_w$. The scaling unit is configured to scale the correction sinogram of random coincidences based on the delay coincidences. The reconstruction unit is configured to iteratively reconstruct one or more images based on the scaled random sinogram and a prompt sinogram for the time period t.

In accordance with another aspect, a method of positron emission tomography (PET) imaging includes generating a correction sinogram of random coincidences defined by a coincidence time window $t_w$ and a time period t based on $r_{ij}=2\,t\,s_i\,s_j$ where $r_{ij}$ is an estimate of the random coincidences in the time period t between singles at detector locations $s_i$ and $s_j$. Delay coincidences in the time period t defined by a delay coincidence time window of a paired coincidences including $t_w$ to $2\,t_w$ are determined. The correction sinogram of random coincidences is scaled based on the delay coincidences. One or more images are iteratively reconstructed based on the scaled random sinogram and a prompt sinogram for the period of time t.

In accordance with another aspect, a positron emission tomography (PET) system (10) includes a memory, one or more processors, and a display device. The memory stores gamma photon detection events, each stored event including a detection time. The one or more processors are configured to identify pairs of the stored events detected with a time window $t_w$ of each other as prompt coincidences, identify pairs of the stored events detected within a time period $t_w$ to $2\,t_w$ of each other as delay coincidences, and identify stored events not paired with other events as singles. The one or more processors are further configured to generate a prompt coincidence sinogram from the identified prompt coincidences, generate a correction sinogram from the identified singles and the identified delay coincidences, subtractively combine the prompt coincidence sinogram and the correction sinogram to compensate prompt events not attributable to gamma photon pairs not generated by a common annihilation event, and reconstruct the combined sinogram into an image. The reconstructed image is displayed on the display device.

One advantage is a more accurate quantification of a radiopharmaceutical standardized update value (SUV).

Another advantage resides in a better correction to the number of detected prompts in a given time window.

Another advantage resides in a correction based on a noiseless measure adjusted for bias.

Another advantage resides in a more accurate measure of random coincidences.

Still further advantages will be appreciated to those of ordinary skill in the art upon reading and understanding the following detailed description.

FIG. 1 schematically illustrates an embodiment of a PET random coincidences correction system.

Figure 2:
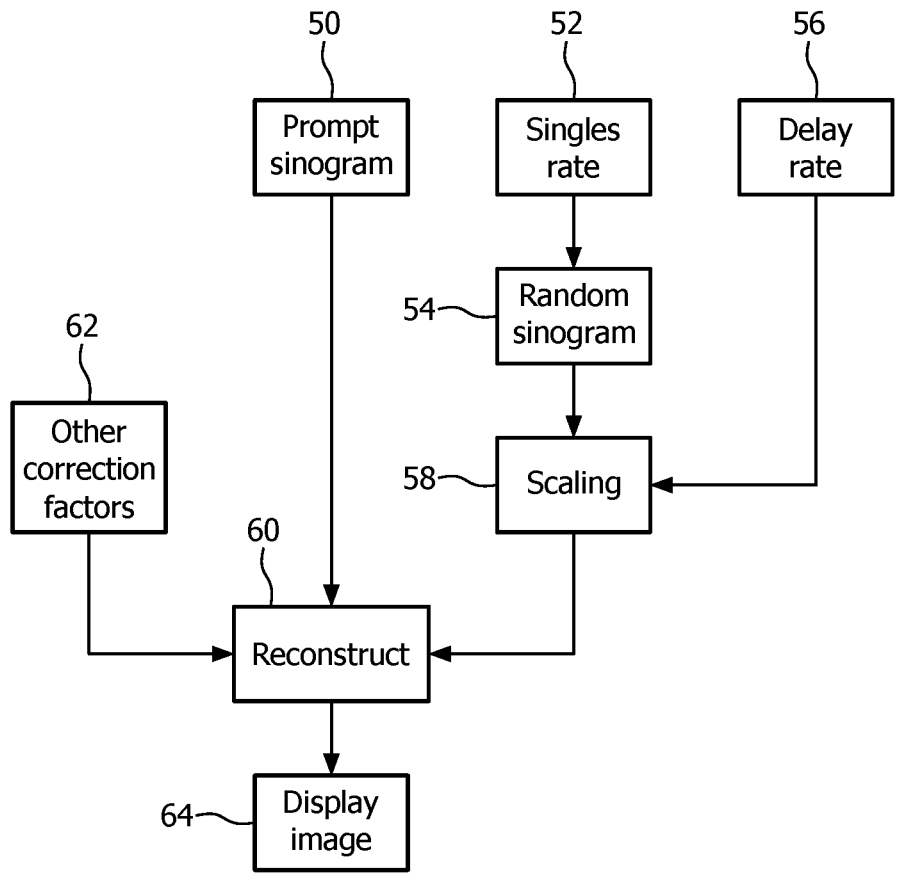

FIG. 2 flowcharts one embodiment of a method of correcting random coincidences.

Figure 3:
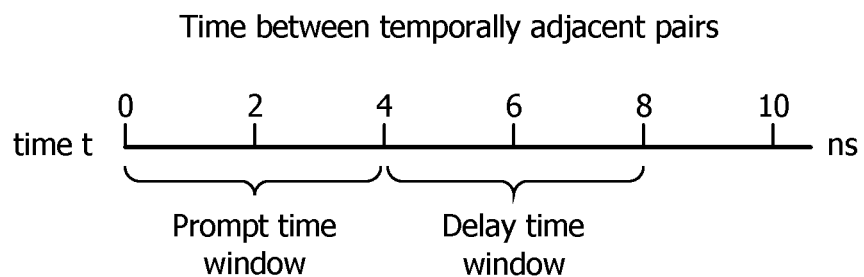

FIG. 3 illustrates an exemplary prompt time window and a corresponding delay time window.

With reference to FIG. 1, an embodiment of a PET system with random coincidences correction 10 is schematically illustrated. A subject is placed is an examination region of a PET scanner 12. The PET scanner 12 includes a plurality of rings of detectors 14 which detect gamma photons originating from positron annihilation events from a radiopharmaceutical. The time and energy of each detected gamma photon is recorded, preferably in list mode, in a data store or memory 16. The recorded gamma photon are filtered with a time window and an energy window to identify different coincidences, such as prompt, scatter, singles, delays, etc. For example, prompt coincidences include photons detected at two detectors within a time window $t_w$, e.g. in the size of 2-6 nanoseconds, and which meet an energy level threshold, e.g. around 511 keV. The PET scanner 12 can include counters, which count the number of prompt coincidence gamma photons detected at each detector and the number of delay coincidence gamma photons detected at each detector.

Each gamma photon is detected by one of the detectors. The detection time, location and, optionally, the energy of each gamma photon is stored as a detection event in list mode in the data store or memory. The detection times of temporally adjacent events are compared with a prompt coincidence time window, $t_w$. Event pairs which occurred within the coincidence window, know as prompt coincidences, are mostly true event pairs, i.e. correspond to gamma photons from a common annihilation event of a radiopharmaceutical injected in a subject, and are assigned as end points of a line-of-response (LOR). Some of the prompt coincidences correspond to gamma photons from different annihilation events and are known as random coincidences. Random coincidences do not define true LORs and degrade the image reconstructed using LORs defined by random coincidences. The coincidence window is typically a little longer than the time in which a gamma photon traverses the longest LOR that the scanner can detect, typically about 2-6 nanoseconds (ns).

A random coincidence time window that is the same size as coincidence window is defined, e.g. $t_w$ to $2t_w$. See FIG. 3. Alternately, the duration random coincidence window can be larger or smaller than the duration prompt coincidence window when the events are scaled accordingly. Pairs in which one gamma photon is detected within the prompt coincidence window, $t_w$, and a second gamma photon detected within the delay window, e.g., between $t_w$ to $2t_w$, known as random coincidences, are taken as delay coincidences. The unpaired events are singles. Gamma photons detected with an energy outside of an energy window, typically spanning 511 keV, have been Compton scattered to an unacceptable degree. The Compton scattered gamma photons do not define a true LOR and can be treated as random coincidences or discarded. As explained in greater detail below, the delay coincidences (which are all random coincidences) and the singles are used to correct the reconstruction of the prompt coincidences to correct or compensate for the random coincidences that occurred within the prompt coincidence window.

A prompt unit 18 generates or includes a means for generating a prompt sinogram from the list mode data store 16. The prompt sinogram includes the true coincidences and the random coincidences that occur within the prompt coincidences window. True coincidences include two gamma photons from a common annihilation event that travel in 180° opposite directions, e.g. a line, between the two detectors which detected the gamma photon events from the common annihilation event and represent a true LOR. In another example, a first annihilation event 20 generates two photon emissions in 180° opposite directions defining a LOR. One of the gamma photons is detected by the detectors and one photon passes undetected outside the field of detection defined by the detectors. A second annihilation event 22 generates two gamma photons, one which is detected and one which passes outside the detection field. Both events occur within the prompt time window $t_w$. The two events represent a random coincidence, but occur in the prompt time window with the true coicidences. The prompt sinogram thus includes LORs representing the true coincidences and the random coincidences. The prompt sinogram includes a pixel for each LOR. The pixel is based on an angle and displacement in the examination region within the field of view of the detectors. For example, a pixel location (x, y, z) where x represents the angle, y represents the displacement, and z represents the number of occurrences or events detected.

A singles unit 24 generates or includes a means for generating a random correction sinogram from singles based on the single photons detected by the detectors. The single photon detections can be received from the list mode data store. In another embodiment counts of the singles are received from counters which count singles by detector location, e.g. scintillator crystal and/or photodiode location. The generated sinogram uses a relationship defined by $r_{ij}=2\,t\,s_i\,s_j$, where t is the time period, and $s_i$ and $s_j$ are the singles rate at detected pixels i and j respectively in the time period t. The random correction sinogram generated from the singles includes a shape and distribution which is effectively noiseless. In another embodiment, the single unit generates based on simulations of a simulator, e.g. single scatter simulations and/or Monte Carlo simulations with the radiopharmaceutical distribution, attenuation map, and PET scanner properties.

A delay unit 26 generates or includes a means for determining delay coincidences. In one embodiment, a counter counts the delay coincidences that occur within the delay window, e.g. one photon detected in the prompt window and one photon detected in the delay window. In another embodiment, the delay unit 26 includes a sinogram unit that generates a delay sinogram based on the delay coincidences. The delay coincidences can be received from the list mode data store 16.

A scaling unit 28 scales or includes a means for scaling the random correction sinogram based on the delay coincidences. In one embodiment the scaling unit 28 scales the shape of the random correction sinogram generated by the singles unit 24 to match the shape of the delay sinogram generated by the delay unit 26. For example, an image stretching algorithm stretches the random correction sinogram to match the shape of the delay sinogram. In another embodiment, the scaling unit 28 scales the random sinogram based on the delay rate, such as by scaling the sinogram to match an overall delay coincidence count. For example, the overall delay count, D, as a scalar adjusts or weights to match the individual pixels counts $Sz_{ij}$ where $z_{ij}$ is the event count for coordinates i and j. In another embodiment, the random correction sinogram is matched to the delay sinogram based on both a scalar and an additive factor, such as based on a least squares transform between the random correction sinogram and the delay sinogram.

A reconstruction unit 30 iteratively reconstructs or includes a means for iteratively or otherwise reconstructing one or more images based on the prompt sinogram and the scaled random correction sinogram. In one embodiment, the scaled random correction sinogram is subtracted from the prompt sinogram. The iterative reconstruction can include other correction factors such as attenuation maps, PET scanner characteristics, and the like. PET scanner characteristics can include aspects of the detectors with respect to photon detection, such as the geometry, sensitivity, timing, and the like. The reconstruction unit can be further configured to compute SUVs for tissues of the subject based on the reconstructed images.

The one or more images are stored in an image data store, such as a departmental radiology information system (RIS), Picture Archiving and Communication System (PACS) and the like, and/or displayed on a display device 32. The display device can include a computing device 34, such as a desktop computer, a laptop, a tablet, a mobile computing device, a smartphone, and the like. The display includes one or more of a LCD display, an LED display, a plasma display, a projection display, a touch screen display, and the like. The display device can display one or more of the delay count, the prompt sinogram, the random sinogram, the scaled random sinogram, or the delay sinogram.

The computing device 34 connects to a network 36 and a healthcare practitioner selects or initiates detection of a radiopharmaceutical in the subject using at least one input device 38. The computing device 34 includes an electronic processor or electronic processing device 40, the display device 32 which displays the reconstructed images, menus, panels, and user controls, and the at least one input device 38 which inputs the healthcare practitioner selections. The input device can be a keyboard, a mouse, a microphone, and the like.

The various units 18, 24, 26, 28, 30 are suitably embodied by an electronic data processing device, such as the electronic processor or electronic processing device 40 of the computing device 34, or by a network-based server computer operatively connected with the computing device 34 by the network 36, or so forth. Moreover, the disclosed sinogram generation, scaling, counting, and image reconstruction techniques are suitably implemented using a non-transitory storage medium storing instructions (e.g., software) readable by an electronic data processing device and executable by the electronic data processing device to perform the disclosed techniques. The electronic processor(s) are programmed and/or configured to perform the disclosed techniques.

The PET scanner 12 connects to the computing device 34 and data store 16 via the network 36. The network can include wired and/or wireless communication connection, public networks, such as the Internet, and/or private networks. The communication connections can be local and/or remote. The data store 16 can include data storage such as solid state memory, disk storage, cloud storage, and the like. The data store 16 can include file and/or database organization.

With reference to FIG. 2, one method of using an embodiment of correcting PET data random coincidences is flowcharted. In a step or module 50, a prompt coincidence sinogram is received which includes true coincidences and random coincidences. The step or module can include generating the prompt coincidence sinogram from list mode data of gamma photon detections by a PET scanner of the subject with the radiopharmaceutical during a prompt coincidence time window $t_w$ for a time period t.

A singles rate is determined in a step or by a module 52 based on a singles rate detected at each detector location and/or by simulation. The step can include using the singles unit 24 to count the singles detected at each detector location in the same time window as the prompt window or timeframe, e.g. the same unit of time as the coincidences used to generate the prompt sinogram. Simulation can include scatter simulation and/or Monte Carlo simulations based on the radiopharmaceutical distribution in the subject, the attenuation map, and the PET scanner characteristics.

In a step or by a module 54, a random coincidence correction sinogram is generated based on the singles rate. The sinogram includes a shape based on the detected singles events. The sinogram includes a count at each pixel and each pixel represents a line-of-response (LOR). The LOR includes an angle and displacement from center and a count of positron events represented. The sinogram is based on the relationship defined by $r_{ij}=2\, t\, s_i\, s_j$, where t is the time period, and $s_i$ and $s_j$ are the singles rate at detected detector locations i and j respectively. The sinogram includes a shape based on the angles and displacement or the LORs, and a distribution based on counts of positron events determined at each LOR.

Delay coincidences are determined in a step or by a module 56. The step or module includes counting the delay coincidences based on the prompt coincidence window and a delay window. In one embodiment, the step includes generating a delay coincidence sinogram based on the detected delay coincidences. For example, coincidences which meet the energy window or threshold, do not occur within the time window for prompt coincidences, and do occur within the delay time window, $t_w$ to $2t_w$ are included in the generated delay coincidences sinogram. Other delay time windows longer or shorter than $2t_w$ are also contemplated.

The random correction sinogram is scaled with the delays in a step or by a module 58. In one embodiment, the scaling unit 28 scales the shape of the random correction sinogram generated by the singles unit 24 to match the shape of the delay coincidences sinogram generated by the delay unit 26. For example, the scaling unit can adjust the dimensions of the random sinogram in the x and/or y direction to match the shape of the delay sinogram, e.g. image scaling algorithm. In another embodiment, the scaling unit 28 scales the random correction sinogram based on the delay rate. For example, the delay count, $D_z$ as a scalar adjusts to match the individual pixels counts $Sz_{ij}$ where $z_{ij}$ is the event count for coordinates i and j. In another embodiment, the random sinogram is matched to the delay sinogram based on both a scalar and an additive factor, such as based on a least squares difference between the random sinogram and the delay sinogram.

In a step or by a module 60, one or more images are reconstructed by the reconstruction unit 30 based on the generated prompt sinogram and the scaled random sinogram. In one embodiment, the scaled random correction sinogram is subtracted from the prompt coincidence sinogram to compensate for the random coincidences included in the prompt coincidence sinogram. Reconstructing can include other correction factors 62.

The one or more images are displayed and/or stored in a step or by a module 64. The reconstructed image is based on the noiseless singles rate scaled by delays. The scaling by the delays corrects for the bias in the singles only estimate to provide a more estimate of randoms in the prompt window or list mode data used to generate the prompt sinogram.

The steps are performed by the units embodied by configured and/or programmed computer processors. The modules are represented by the embodied units. One or more electronic processors programmed and/or configured performs the steps, e.g. executed software.

It is to be appreciated that in connection with the particular illustrative embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

What is claimed is:

1. A positron emission tomography (PET) imaging system, comprising:
   at least one electronic processor programmed to:
   generate a correction sinogram of random coincidences defined by $r_{ij}=2\,t\,s_i\,s_j$ where $r_{ij}$ is an estimate of the random coincidences in a time period t between singles at detector locations $s_i$ and $s_j$, the generating including simulating the singles at detector locations $s_i$ and $s_j$ at each detector location based on a distribution of a radiopharmaceutical, an attenuation map, and at least one PET scanner characteristic;
   determine delay coincidences in the time period t defined by a delay coincidence time window of a paired coincidences;
   scale the correction sinogram of random coincidences based on the delay coincidences; and
   iteratively reconstruct one or more images based on the scaled correction sinogram of random coincidences and a prompt sinogram for the time period t.

2. The PET imaging system according to claim 1, wherein generate a correction sinogram of random coincidences defined by $r_{ij}=2\,t\,s_i\,s_j$ where $r_{ij}$ is an estimate of the random coincidences in a time period t between singles at detector locations $s_i$ and $s_j$ includes:
   using a plurality of counters to count singles detected at each detector location.

3. The PET imaging system according to claim 2, wherein the simulating includes using one of a Monte Carlo simulation or a scatter simulation.

4. The PET imaging system according to claim 1, wherein determine delay coincidences in the time period t defined by a delay coincidence time window of a paired coincidences includes at least one of:
   counting the delay coincidences in the time period t; or
   generating a delay coincidence sinogram based on the delay coincidences at the detector locations.

5. The PET imaging system according to claim 1, wherein scale the correction sinogram of random coincidences based on the delay coincidences includes:
   matching the correction sinogram of random coincidences to a delay coincidence sinogram.

6. The PET imaging system according to claim 5, wherein matching the correction sinogram of random coincidences to a delay coincidence sinogram includes at least one of:
   matching the shape of the correction sinogram of random coincidences to the shape of the delay coincidence sinogram using an image stretching algorithm; or
   using a scaler and an additive factor transform of the correction sinogram of random coincidences to match the delay coincidence sinogram.

7. The PET imaging system according to claim 1, wherein the at least one electronic processor is further programmed to:
   generate the prompt sinogram from list mode data of detected gamma photon events detected in the time period t.

8. The PET imaging system according to claim 7, further including:
   a plurality of detectors configured to detect gamma photons from positron annihilation events of the radiopharmaceutical administered to the subject;
   a list mode memory configured to store a time and detector location of detected gamma photons;
   wherein the at least one electronic processor is further programmed to identify prompt coincidence pairs temporally spaced by times within a prompt coincidence time window $t_w$.

9. The PET imaging system according to claim 1, further including:
   a display device configured to display the one or more iteratively reconstructed images and a count of delay coincidences.

10. The PET imaging system according to claim 1, wherein the at least one electronic processor is further programmed to:

compute standardized uptake values (SUVs) for tissues of a subject based on the one or more iteratively reconstructed images.

11. A method of positron emission tomography (PET) imaging, comprising:
generating a correction sinogram of random coincidences defined by $r_{ij}=2\,t\,s_i\,s_j$ where $r_{ij}$ is an estimate of the random coincidences in a time period t between singles at detector locations $s_i$ and $s_j$, the generating including simulating the singles at each detector location based on a distribution of a radiopharmaceutical, an attenuation map, and at least one PET scanner characteristic;
determining delay coincidences in a time period t defined by a delay coincidence time window of a paired coincidences including $t_w$ to $2\,t_w$;
scaling the correction sinogram of random coincidences based on the delay coincidences matching the correction sinogram of random coincidences to a delay coincidence sinogram; and
iteratively reconstructing one or more images based on the scaled correction sinogram of random coincidences and a prompt sinogram for the period of time t.

12. The method of PET imaging according to claim 11, wherein generating includes:
counting singles detected at each detector location.

13. The method of PET imaging according to claim 11, wherein determining includes at least one of:
counting the delay coincidences in the time period t; or
generating a delay coincidence sinogram based on the delay coincidences at the detector locations.

14. The method of PET imaging according to claim 11, wherein matching includes at least one of:
stretching a shape of the correction sinogram of random coincidences to the shape of the delay coincidence sinogram; or
transforming the random correction sinogram with a scaler and an additive factor to match the delay coincidence sinogram.

15. The method of PET imaging according to claim 11, further including:
generating the prompt sinogram from list mode data of detected gamma photon events detected in the time period t.

16. The method of PET imaging according to claim 11, further including:
displaying the one or more iteratively reconstructed images and count of delay coincidences.

17. A non-transitory computer-readable storage medium carrying software which controls one or more electronic data processing devices to perform the method according to claim 11.

18. An electronic data processing device configured to perform the method according to claim 11.

19. A positron emission tomography (PET) system, comprising:
a memory which stores gamma photon detection events, each stored event including a detection time;
one or more processors configured to:
identify pairs of the stored events detected with a prompt time window of each other as prompt coincidences;
identify pairs of the stored events detected within a delay time period of each other as delay coincidences, the delay time period following the prompt time period;
identify stored events not paired with other events as singles;
generate a prompt coincidence sinogram from the identified prompt coincidences;
generate a correction sinogram from the identified singles and the identified delay coincidences by operations including simulating the singles at each detector location based on a distribution of a radiopharmaceutical, an attenuation map, and at least one PET scanner characteristic;
match the prompt coincidence sinogram and the correction sinogram by subtractively combining the prompt coincidence sinogram and the correction sinogram to compensate for prompt events attributable to gamma photon pairs not generated by a common annihilation event to generate a combined sinogram; and
reconstruct the combined sinogram into an image; and
a display device on which the reconstructed image is displayed.

* * * * *